United States Patent
Roberson et al.

[11] Patent Number: 6,137,623
[45] Date of Patent: Oct. 24, 2000

[54] MODULATABLE REFLECTORS AND METHODS FOR USING SAME

[75] Inventors: Mark W. Roberson; Glenn A. Rinne, both of Cary; Philip A. Deane, Durham; Karen W. Markus, Raleigh, all of N.C.

[73] Assignee: MCNC, Research Triangle Park, N.C.

[21] Appl. No.: 09/042,836

[22] Filed: Mar. 17, 1998

[51] Int. Cl.$^7$ .................................................. G02B 26/00
[52] U.S. Cl. ........................ 359/291; 359/292; 359/290
[58] Field of Search ..................... 359/290–298

[56] References Cited

U.S. PATENT DOCUMENTS

| | | | |
|---|---|---|---|
| 3,917,196 | 11/1975 | Pond et al. | 244/77 |
| 4,025,193 | 5/1977 | Pond et al. | 356/5 |
| 4,143,946 | 3/1979 | Leo et al. | 350/310 |
| 4,209,689 | 6/1980 | Linford et al. | 455/609 |
| 4,361,911 | 11/1982 | Buser et al. | 455/605 |
| 4,447,723 | 5/1984 | Neumann | 250/236 |
| 4,517,569 | 5/1985 | Gerharz | 343/18 |
| 4,727,593 | 2/1988 | Goldstein | 455/605 |
| 4,731,869 | 3/1988 | Sepp et al. | 455/605 |
| 4,762,426 | 8/1988 | Foss . | |
| 4,777,660 | 10/1988 | Gould et al. | 455/605 |
| 4,887,310 | 12/1989 | Meyzonnette et al. | 455/604 |
| 4,983,021 | 1/1991 | Fergason | 350/332 |
| 5,274,379 | 12/1993 | Carbonneau et al. | 342/45 |
| 5,311,360 | 5/1994 | Bloom et al. | 359/572 |
| 5,355,241 | 10/1994 | Kelley | 359/170 |
| 5,438,449 | 8/1995 | Chabot et al. | 359/216 |
| 5,568,307 | 10/1996 | Williams | 359/295 |
| 5,583,507 | 12/1996 | D'Isepo et al. | 342/45 |
| 5,661,592 | 8/1997 | Bornstein et al. | 359/291 |
| 5,757,562 | 5/1998 | Apollonov et al. | 359/846 |

FOREIGN PATENT DOCUMENTS

| | | |
|---|---|---|
| 2 094 174 | 10/1994 | Canada . |
| 0 807 841 | 11/1997 | European Pat. Off. . |
| 3230159 C1 | 4/1983 | Germany . |
| 2 123 248 | 1/1984 | United Kingdom . |
| 2 307 762 | 6/1997 | United Kingdom . |
| WO95/23352 | 8/1995 | WIPO . |

OTHER PUBLICATIONS

"Microwave Reflection Properties of a Rotating Corrugated Metallic Plate Used as a Reflection Modulator", Gordon E. Peckham and Robert A. Suttie, *IEEE Transactions on Antennas and Propagation*, vol. 36, No. 7, Jul. 1988, pp. 1000–1006.

"Large Aperture Stark Modulated Retroreflector at 10.8 $\mu$m", M.B. Klein and R.H. Sipman, *J. Appl. Phys.*, 51(12), Dec. 1980, pp. 1601–1604.

"A Large–Aperture Electro–Optic Diffraction Modulator", *J. Appl.Phys.* 50(11), Nov. 1979, pp. 6691–6693.

Manabu Ataka et al., "A Biomimetic Micro Motion System—a Ciliary Motion System", The 7th International Conference on Solid–State Sensors and Actuators—Transducers '93, Yokohama, Japan, Jun., 1993, pp. 38–41 (ISBN 4–9900247–2–9).

"Dry–Released Process for Aluminum Electrostatic Actuators", Christopher W. Storment et al., Solid–State Sensor and Actuator Workshop, Hilton Head, South Carolina, Jun. 13–16, 1994.

(List continued on next page.)

*Primary Examiner*—Frank G. Font
*Assistant Examiner*—Evelyn A. Lester
*Attorney, Agent, or Firm*—Alston & Bird LLP

[57] ABSTRACT

A reflector having a mechanically deformable portion of at least one reflective surface is disclosed. By deforming the portion of the reflective surface, discontinuity is introduced in that portion of the reflective surface. The discontinuity in the reflective surface scatters incident radiation signals so as to cause attenuation in the reflected signal. By selectively deforming the portion of the reflective surface, the reflected signal can be modulated to encode data thereon. The mechanically deformable portion of the reflective surface preferably comprises plates integrally formed therein.

30 Claims, 6 Drawing Sheets

OTHER PUBLICATIONS

Deformable Grating Light Valves for High Resolution Displays Apte et al., Ginzton Laboratory, Stanford University, Solid–State Sensor and Actuator Workshop, Hilton Head, South Carolina, Jun. 13–16, 1994.

W. Benecke, "Silicon—Microactuators: Activation Mechanisms and Scaling Problems", 1991 IEEE International Conference on Solid–State Sensors and Actuators Proceedings, San Francisco, Jun., 1991, pp. 46–49 (ISBN 0–87942–585–3).

Devi S. Gunawan et al., Micromachined Corner Cube Reflectors As A Communication Link, *Sensors and Actuators A*, vol. A47, No. 1/03, Mar. 1, 1995, pp. 580–583, XP000516324.

M. Edward Motamedi et al., Development of Micro–Electro–Mechanical Optical Scanner, *Optical Engineering*, vol. 36, No. 5, May 1, 1997, pp. 1346–1352, XP000692364.

MODULATABLE REFLECTORS AND METHODS FOR USING SAME

FIELD OF THE INVENTION

The present invention generally relates to radiation reflectors, and moire particularly, to electromagnetic and optical reflectors having a modulatable reflective surface.

BACKGROUND OF THE INVENTION

In the field of electromagnetic and optical radiation, retroreflectors are well known devices which are often used as transponders. Retroreflectors receive electromagnetic energy and reflect such energy back in the direction from whence it came. A passive retroreflector returns a signal with the same general characteristics of the incident signal, preferably with relatively high directional gain and relatively little spreading of the incident beam. In contrast, an active retroreflector may include an emitting device that can generate a user definable signal in response to the incident radiation beam.

Retroreflectors have found a wide variety of applications in numerous fields including communications systems, monitoring systems, and in-flight refueling systems. Examples of different types of retroreflector structures include a corner-cube reflector, a horn reflector, a parabolic dish reflector, and a parabolic cylinder reflector. Illustrations of these and other retroreflector configurations can be found in numerous publications including, for example, U.S. Pat. No. 4,517,569 to Gerharz. Another type of well known retroreflector is a cassegrain reflector, as disclosed by Gordan E. Peckham and Robert A. Suttie in *"Microwave Reflection Properties of a Rotating Corrugated Metallic Plate Used as a Reflection Modulator,"* IEEE Transactions on Antennas and Propagation, Vol. 36, No. 7, pp. 1000–1006 (July 1988).

Yet another application of retroreflectors is in the task of identifying friend-or-foe (IFF) in a battleground setting. Since the evolution of weaponry which allowed opposing forces to fight through the exchange of the instrumentalities of war at a distance, fratricide killing has been a problem. IFF tasks are a delicate comprise between secure, ambiguous identification and the maintenance of stealth positions. In typical IFF systems, a radio or microwave frequency request is made by an interrogation unit such as a plane or tank and a corresponding signal is returned by the targeted unit. This is normally achieved by a transponder on the targeted unit that emits a coded return signal when the interrogation request is received. Other systems merely re-radiate or reflect the incident interrogation request, while some systems modulate the re-radiated or reflected signal in an distinctive manner. The interrogation unit then deciphers the received signal to determine if the targeted unit is a friend or foe. However, by emitting (i.e., reflecting) a broadly directed response that is designed to have a sufficient strength to reach the interrogation unit, some of the radiation may be detected by other units of the opposing force which may reveal the position of the targeted unit.

Examples of re-reflector systems utilized in IFF tasks are discussed in U.S. Pat. No. 4,361,911 to Buser et al., and U.S. Pat. No. 5,274,379 to Carbonneau et al. The patent to Buser et al is directed to a laser retroreflection system with a high power laser interrogator and a dedicated receiver that sends a laser pulse with a cryptic interrogation message that can be decoded by a friendly target. The friendly target has a retroreflector that reflects the laser light only when the correct preselected cryptic interrogation message is detected. An acousto-optic modulator modulates the reflected signal with a preassigned intensity modulation. If the modulation code dedicated by the receiver of the laser interrogator is correct, the target is deemed friendly. However, the system of Buser et al. requires over 100 watts to operate, which in even short burst modes may be too high for many light weight applications. In addition, residual radio frequency (RF) leakage may make an acousto-optic device such as the one disclosed in Buser et al. easily detectable by hostile forces. Moreover, it appears that the system of Buser et al. may require precise spatial registration of the source lens and the receiver lens to ensure retroreflection of the incident laser pulse.

The patent to Carbonneau et al. is directed to an optical system wherein all vehicles are provided with a radiation transmitter and a receiver. The receiver includes a detector for detecting radiation transmitted by other vehicles. When a vehicle receives and correctly identifies a coded signal from another friendly vehicle, an unblocking signal is produced to clear the radiation transmission path, thereby allowing a reflector to reflect the received signal back to the source of the transmission. The reflector further adds a predetermined code to the reflected signal so that the vehicle receiving the reflected signal can identify the further predetermined code. The reflector in Carbonneau et al. is a retroreflector that utilizes a rotating disk to add the predetermined code to the reflected signal. However, because the information encoded on the reflected signal depends upon the disk, the total amount of information which can be transmitted is limited by the particular disk utilized, and how fast the disk can be made to rotate on the spindle.

Therefore, an unsatisfied need exists in the industry for a low power reflector system capable of providing stealth communications.

SUMMARY OF THE INVENTION

It is therefore an object of the present invention to provide an improved low power reflector system suitable for use in IFF tasks.

It is another object of the present invention to provide an improved reflector capable of modulating a reflected signal with a reduced signature.

It is another object of the present invention to provide an improved method for modulating a reflected signal utilizing a reflector system.

It is another object of the present invention to provide an improved reflector with data encoded on the reflective surface thereof.

These and other objects are provided according to the present invention by selectively mechanically deforming a portion of at least one reflective surface, of a reflector in order to introduce and/or remove discontinuity in that portion of the reflective surface. The discontinuity in the reflective surface essentially scatters the incident radiation signal so as to cause attenuation of the reflected signal. By selectively actuating the deformable portion at the reflective surface, the reflected signal can be modulated to encode data thereon. In addition, data may be encoded on the surface of the deformable portion of the reflective surface to form a self-modulated reflector.

A reflector in accordance with the present invention will have many advantageous applications including the following. A first application may be as a field installed communications unit that is capable of communicating with a remote system where it may be too costly, too difficult, or undesirable to communicate using traditional forms of communication. An example may be tracking the movements of military troops about a battlefield. A second application may be as an emergency location device which has low power consumption. In this application, where ground clutter and other obstacles may reduce visibility and introduce noise, a retroreflector that modulates an interrogation signal so as to return a distinctive reflected signal may aid in the location of a lost person or vehicle. A third application may be in security verification of distant objects such as is currently done with proximate objects using magnetic badges and bar codes. A fourth application may be in establishing secure optical communications between a low mass robot configured to interrogate a mine field and a central site surveyor. In this application, the surveyor scans the mine filed with an optical signal that may be reflected by a reflector located on the robot. The robot may be equipped with a propulsion system that spatially displaces the robot in a periodical basis. At each location, the robot may have the opportunity to reflect the optical scan signal of the surveyor in a distinctive manner using reflectors in accordance with the present invention to indicate the detection of a detonation byproduct or an explosive material. Again, it is noted that these are merely illustrative applications of a reflector in accordance with the present invention, and many other applications will be apparent to those skilled in the art.

Moreover, a reflector having a selectively deformable portion in accordance with the present invention can be fabricated using micro- electromechanical systems (MEMS) technology. This technology has been recently developed by the assignee of the present invention. A reflector fabricated utilizing MEMS technology may be potentially a low cost device due to the use of microelectronic fabrication techniques. Further, such a reflector may be much smaller than conventional devices.

In a first embodiment of the present invention, a microfabricated reflector that can receive an incident radiation signal from a radiation source and alter a reflectivity thereof comprises a reflective structure which reflects the incident radiation signal to produce the reflected radiation signal, wherein the reflective structure comprises at least one reflective surface. The reflector may further include means associated with a portion of the reflective surface for selectively introducing discontinuity in the portion of the reflective surface to selectively alter the reflectivity thereof and reduce (or scatter) the reflected radiation signal. In accordance with an aspect of the present invention, the means for selectively introducing discontinuity may passively encode data on the reflected radiation signal. Further, the reflective structure may include a second reflective surface with means for introducing discontinuity associated with the second reflective surface.

Preferably, the reflector is a retroreflector such that the incident radiation signal is reflected in a direction substantially toward the radiation source. The retroreflector may be a corner-cube reflector, horn reflector, or parabolic reflector.

In accordance with another aspect of the present invention, the means for introducing discontinuity may comprise at least one moveable structure, such as a plate. The moveable plate may take virtually any regular shape such as rectangular, triangular, circular, polygonal, or any non-regular shape. The moveable plate may be actuated by numerous methods such as electrostatically, thermally or magnetically. In construction, the moveable plates may include a plate member having a first material layer of a first residual stress value and a second material layer disposed opposite the first layer, wherein the second layer is of a second residual stress value that is different than the first residual stress value causing the plate member to move in a non-planar manner, such as in an arching or curling fashion. The curling of the plate member creates discontinuity in a portion of the reflective surface. Alternatively, the plate may comprise a single layer of a material such as polysilicon, which has a non-planarity caused by the residual stress of the polysilicon, as well known.

In order to reduce the signature of the reflected signal and reduce the likelihood of unwanted identification, the moveable plates may be individually actuated. Further, where the means for introducing discontinuity comprises a plurality of moveable plates, the moveable plates may be located on the reflective surface in a non-regular pattern. Yet further, the means for introducing discontinuity may be controllably actuated to vary an amount of the incident radiation signal that is reflected.

In accordance with yet another aspect of the present invention, the means for introducing discontinuity may comprise a structure such as a beam that is rigidly mounted in at least one place. The beam may take virtually any regular or non-regular shape. The beam may be actuated electrostatically, thermally or magnetically. Preferably, the beam structure comprises a single layer of polysilicon that is stressed so that the beam structure exhibits non-planarity, thereby creating discontinuity in a portion of the reflective surface. The beam may also include a three-dimensional pattern on the reflective surface thereof for passively encoding data on the reflected signal.

The microelectronic reflector may further comprise a radiation emitter associated with the reflective structure. The radiation emitter may be mounted to a reflective surface of the reflective structure. In addition, the microelectronic reflector may also comprise a radiation detector associated with the reflective structure. The radiation detector may be mounted to a reflective surface of the reflective structure.

In a second embodiment of the present invention, a microelectronic reflector for passively encoding data on a reflected radiation signal comprises a reflective structure having at least one reflective surface that reflects an incident radiation signal towards a source thereof, and a selectively actuatable plate located on at least a portion of the reflective surface of the reflective structure. The actuatable plate is for introducing discontinuity in a portion of the reflective surface for scattering the incident radiation signal, thereby encoding data on the reflected radiation signal in accordance with selective actuation of the plate. The plate may be actuated by numerous methods such as electrostatically, thermally or electromagnetically. The microelectronic reflector may further comprise a radiation emitter and/or a radiation detector associated with the reflective structure.

Further, the reflector may include a second actuatable plate, wherein the plate and the second plate may be individually actuatable in order to reduce the distinctiveness of the signature of the reflected signal. Where the reflective surface includes a plurality of plates, the plates may be disposed in a non-regular pattern in order to reduce the distinctiveness of the signature of the reflected signal.

In a third embodiment of the present invention, a method for modulating a radiation signal utilizing a reflector comprises the steps of receiving an incident radiation signal by the reflector, and selectively mechanically deforming a portion of a surface of the reflector to cause discontinuity in the surface and to reduce an amount of the incident radiation signal reflected by the reflector. The step of deforming the portion of the surface may include the step of modulating the reflected incident radiation signal. The step of deforming the portion of the surface may also include the step of varying the degree of deformation over time. The step of mechanically deforming the portion of the surface may also include the step of applying an electrostatic charge to a plate mechanism.

If the reflector includes a radiation emitter, then the method may include the step of generating a second radiation signal by the emitter in response to the received radiation signal. In addition, if the reflector includes a radiation detector, then the method may include the step of detecting the radiation signal by the detector.

The method may further include the step of mechanically deforming a second portion of the surface of the reflector to a different degree than the deformation of the portion so as to cause non-regular discontinuity in the surface. The degree of deformation of the second portion of the surface of the reflector also may be varied over time.

The reflector may comprise a moveable plate mechanism that includes a plate member and an actuation mechanism, in which case the step of mechanically deforming a portion of the surface may include the step of moving the plate member relative to the surface of the reflector by the actuation mechanisms. If the reflector includes a plurality of electrostatic plate mechanisms, then the step of mechanically deforming a portion of the surface may include the step of individually moving each of the plate members independently. The step of mechanically deforming the portion of the surface may include the step of deforming the surface in response to a signal from the actuation mechanism for encoding data on the reflected signal. Further, step of encoding may include amplitude modulation, frequency modulation, or phase modulation of the reflected signal.

DETAILED DESCRIPTION OF THE PREFERRED EMBODIMENTS

Figure 1:
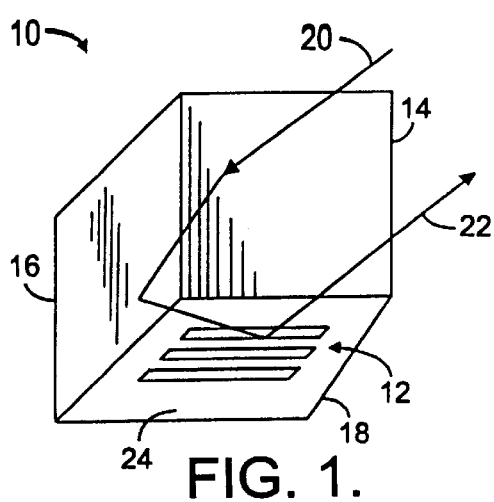
FIG. 1 is a perspective view of a corner-cube retroreflector having electrostatic plates in accordance with the present invention, wherein the electrostatic plates are shown in a substantially flat or planar position.

The present invention will now be described more fully hereafter with reference to the accompany drawings, in which preferred embodiments of the invention are shown. This invention may, however, be embodied in many different forms and should not be construed as limited to the embodiments set forth herein. Rather, these embodiments are provided so that the disclosure will be thorough and complete, and will fully convey the scope of the invention to those skilled in the art. In the drawings, the elements are not necessarily drawn to scale. Furthermore, like numbers refer to like elements throughout.

With reference to FIG. 1, illustrated is a corner-cube retroreflector 10 incorporating electrostatic plates 12 in accordance with an embodiment of the present invention. The corner-cube retroreflector 10 comprises a first microelectronic, substrate 14, a second microelectronic substrate 16, and a third microelectronic substrate 18. The microelectronic substrates 14, 16, and 18 are interconnected to form a microelectronic retroreflector as shown. Though the microelectronic substrates 14, 16, and 18 maybe interconnected by a number of different methods as will be recognized by those skilled in the art, a preferred method is using the arch solder interconnect technique. Briefly stated, an arch solder interconnect technique includes the formation of a plurality of solder bumps along an edge of a first substrate which is then positioned adjacent to a second substrate. The solder bumps are expanded by reflowing additional solder into the plurality of solder bumps so that the solder bumps become superhemispherical and contact the second substrate forming the arch solder interconnect. The additional solder may be provided from an elongated, narrow solder-containing region adjacent into the solder bump. Surface tension from the elongated solder-containing region causes the solder to flow from the elongated solder-containing region into the solder bump, thereby expanding the volume of the solder bump causing it to expand to and contact the second substrate. A more detailed discussion of arch solder interconnects can be found in copending application Ser. No. 08/654,539, filed May 29, 1996, now U.S. Pat. No. 5,793,116, entitled "*Microelectronic Packaging Using Arched Solder Columns*," assigned to the assignee of the present invention, the disclosure of which is incorporated herein by reference as if set forth in full. This technique may be used for fabricating each of the reflectors described herein.

It is noted that although the microelectronic substrates 14, 16, 18 are shown as substantially square or rectangular, those skilled in the art will recognized that the microelectronic substrates 14, 16, 18 can have other shapes such as triangles so as to form a pyramid for frustum structure. Alternative configurations of the microelectronic substrates 14, 16, and 18 may be advantageous for improving the packaging or mounting of the corner-cube retroreflector 10.

As shown in FIG. 1, the corner-cube retroreflector 10 is configured to receive an incident radiation signal 20 and produce a reflected radiation signal 22 directed substantially parallel to the incident radiation signal 20. Thus, the reflected radiation signal 22 is reflected back in the direction from whence it came. As shown, this typically entails the incident radiation signal 20 being reflecting off two or more surfaces that have a combine reflected angle of approximately 180°. Therefore, a substantial portion of the incident radiation signal is returned to its source with the same general characteristics and relatively little spreading or scattering. Further, it is noted that retroreflectors such as the corner-cube retroreflector 10 are self-aligning, such that regardless of the incident angle of the radiation signal 20, the reflected radiation signal 22 is substantially parallel thereto.

The electrostatic plates 12 are provided on a portion of the substrate IS of the corner-cube retroreflector 10, as shown in FIG. 1. The electrostatic plates 12 are provided to selectively introduce discontinuity in the reflective surface 24, thereby causing attenuation in the reflected radiation signal which essentially reduces the amount or strength of the incident radiation signal that is reflected back to the source of the radiation.

Figure 2A:
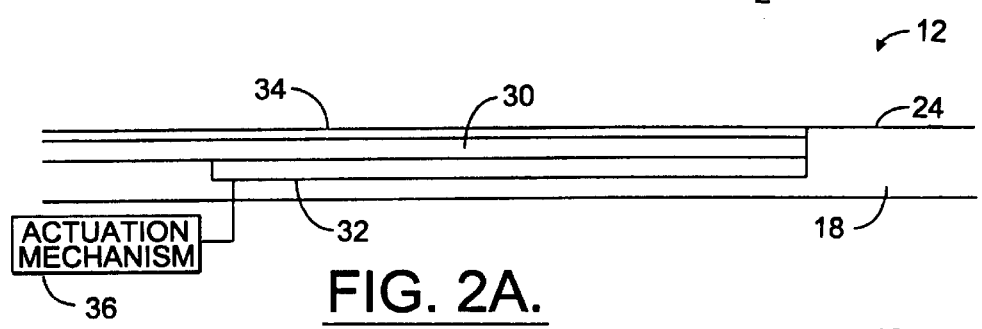
FIG. 2A is an elevational view of an electrostatic plate in a flat or planar position.

In a first position, the electrostatic plates 12 are substantially flat (or planar) as illustrated in FIG. 2A. In this position, as also illustrated in FIG. 1, the electrostatic plates 12 do not introduce any significant amount of discontinuity into the reflective surface 24. Thus, the corner-cube retroreflector 10 operates as though the electrostatic plates 12 were not present, and substantially all the incident radiation 20 is reflected back to its source.

Figure 3:
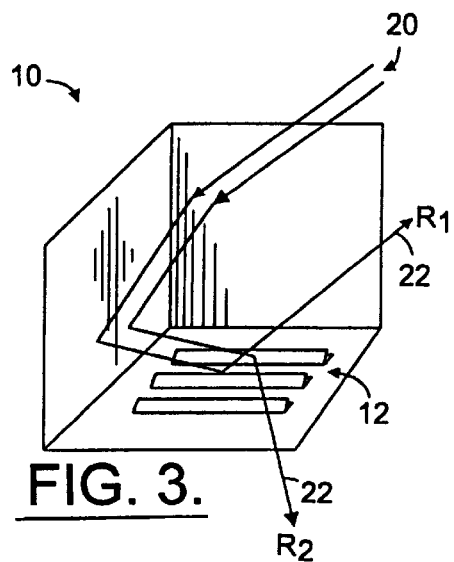
FIG. 3 is a perspective view of the corner-cube retroreflector of FIG. 1, wherein the electrostatic plates are in a raised position as illustrated in FIG. 2B.
Figure 2B:
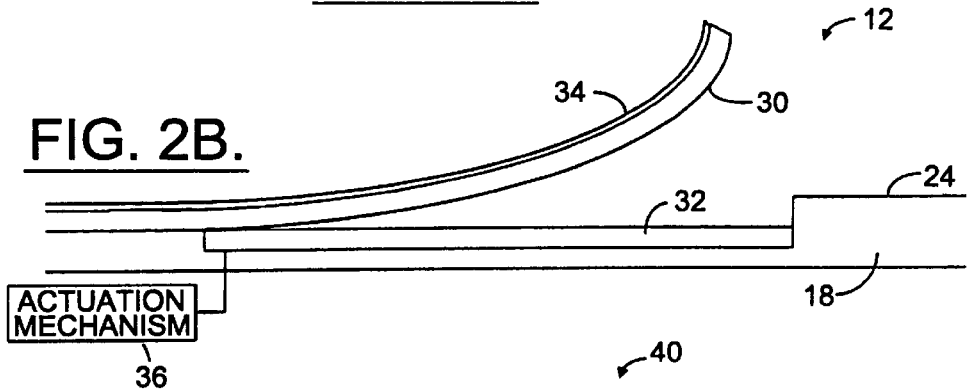
FIG. 2B is an elevational view of the electrostatic plate of FIG. 2A in a curled position.

In a second position, the electrostatic plates are curled away from the reflective surface 24, as illustrated in FIG. 2B. In this position, the electrostatic plates 12 introduce discontinuity in the reflective surface 24 which causes scattering of the incident radiation signal 20, as shown in FIG. 3. Thus, only a portion of the incident radiation 20 may be reflected back toward the radiation source as indicated by signal R1, and a portion of the incident radiation 20 is scattered as indicated by signal R2. The resultant scattering attenuates the reflected signal R1, and thus, only a portion of the incident radiation signal is reflected back to its source.

It should be noted at this point that while the corner-cube retroreflector 10 is designed to reflect the incident radiation back towards its source, other reflectors in accordance with the present invention may be designed to reflect the incident radiation signal in a predetermined direction not toward its source. Thus, the radiation signal incident such a reflector may be selectively scattered so that only a portion of the incident signal is reflected in the predetermined direction. This substantially equivalent to the operation of the corner-cube retroreflector described herein, and is within the scope of the present invention.

The electrostatic plate 12 can be formed in the microelectronic substrate 18 utilizing microelectromechanical systems (MEMs) technology. A detailed discussion of electrostatic plate fabrication can be found, for example, in W. Benecke, "*Silicon-Microactuators: Activation Mechanisms and Scaling Problems,*" 1991 IEEE International Conference on Solid-State Sensors and Actuators Proceedings, San Francisco, June, 1991, pp. 46–49 (ISBN 0-87942-585-3).

For example, with reference to FIGS. 2A and 2B, a plate member 30 can be formed by depositing and patterning a thin polysilicon conductive layer 32 on a substrate for operating as a lower electrode. A sacrificial layer of oxide may then deposited over the lower electrode 32 and a polysilicon layer deposited thereover. The polysilicon layer is then patterned and etched to form the plate member 30. The plate member 30 is released by removing the sacrificial layer of oxide. A metal layer 34 (preferable titanium or chromium) that is tensile in nature is deposited and patterned over the plate member 30. By utilizing a metal having a tensile value greater than that of the polysilicon comprising the plate member 30, the residual stress distribution from the composite bilayer construction will cause the plate member 30 to curl away from or move relative to the reflective surface 24, as shown in FIG. 2B. Thus, in an unactuated or normal position, the plate member 30 is curled away from the substrate 18.

By placing a pre-determined voltage charge on the lower electrode 32 via an actuation mechanism 36 such as a microprocessor, the plate member 30 is drawn toward the lower electrode 32 such that the plate member 30 is substantially flat in its fully actuated state, as shown in FIG. 2A. A voltage charge of approximately less than 150 volts should be sufficient to fully actuate a plate 2 microns thick, and 20 microns wide.

It is noted at this point that those skilled in the art will recognize that there are various other methods of fabricating electrostatic plates suitable for implementing the present invention. For example, an all metal bi-layer plate member may be fabricated using an organic release layer. Further discussion of such alternative fabrication methodologies can be found in Marc Madou, Fundamentals of Microfabrication, CRC Press (1997) (ISBN 0-8493-9451-1). Accordingly, since suitable surface micromachining techniques are well known to those skilled in the art, further discussion herein is not necessary.

While the electrostatic plates 12 described herein are rectangular in shape, it will be understood by those skilled in the art that the electrostatic plates may take other regular shapes such as triangular, circular, polygonal, or virtually any regular or nonregular shape. Further, methods of actuating the plate members other than electrostatically may be utilized in accordance with the present invention. For example, the plate members may be thermally actuated using thermal bimorphs or shape memory alloys. A description of thermally actuated plates can be found, for example, in Manabu Ataka, et al., "*A Biomimetic Micro Motion System—A Ciliary Motion System,*" The 7th International Conference on Solid-State Sensors and Actuators-Transducers '93, Yokohama, Japan, June, 1993, pp. 38–41 (ISBN 4-9900247-2-9). Briefly, one type of thermally actuated plate may comprise a heater layer sandwiched between two polymer layers, wherein the polymer layers have different coefficient of thermal expansion so that the plate curls when heated. The curl is generally in the direction of the layer having the higher coefficient of thermal expansion. The heater preferably comprises a metallic layer of gold and/or nickel. By passing a current in the heater layer, the plate uncurls and becomes substantially planar. Alternatively, the plate may be electromagnetically actuated. For example, coils can be integrated in the substrate opposite the plaite, and the plate may include a magnetic material. The plate members can then be deformed by passing a current through the coil which creates an electric filed that may either attract or repel the plate member so as to deform the plate.

By controlling the frequency of actuation of the plate members 30, data can be encoded on the reflected radiation signal using a variety of modulation schemes such as amplitude modulation, phase modulation, or frequency modulation. For instance, if the incident radiation signal is a direct current (DC) signal, then the plate member; 30 can be actuated in time so that the reflected radiation signal oscillates between essentially two power levels. Thus, binary data may be encoded on the reflected radiation signal.

The electrostatic plates 12 described above can achieve modulation frequencies in the kilohertz range. An inhibitor to even higher frequency operation is air dampening or resistance. The problem of air dampening may be reduced by fabricating narrower plate members 30, and/or fabricating ventilation holes through the plate members 310. Alternatively, the structure can be fabricated in a vacuum package that is hermetically sealed to substantially eliminate the problem of air dampening when actuating; the electrostatic plates.

It is further noted that the amount of attenuation imposed upon the incident radiation signal can be controlled. For example, the attenuation can be controlled by the amount of the reflective surface(s) that is covered by the electrostatic plates. If only a small portion of the reflective surface is covered by one or more electrostatic plate, then a corresponding portion of the incident radiation signal is scattered when the electrostatic plates are in a curled position (i.e., an unactuated position as illustrated in FIG. 2B). Likewise, by covering a larger portion of the reflective surface(s) of a retrorelector, a correspondingly larger portion of the incident radiation signal is scattered, and therefore, less of the incident radiation signal is reflected back by the retroreflector. Accordingly, the characteristics of the reflected radiation signal can be partially controlled by designing a retroreflector having a defined portion of its reflective surface(s) covered by electrostatic plates. If a sufficient portion of the reflective surface(s) is covered by electrostatic plates, then substantially all of the incident radiation signal may be scattered and essentially none of the radiation signal will be reflected back to the radiation source. Such a configuration may be particularly advantageous in certain applications such as in a battlefield where it may be desirable not to reflect any of the incident radiation beam until verification can be made that the incident beam is from a friendly interrogation unit.

Figure 4:
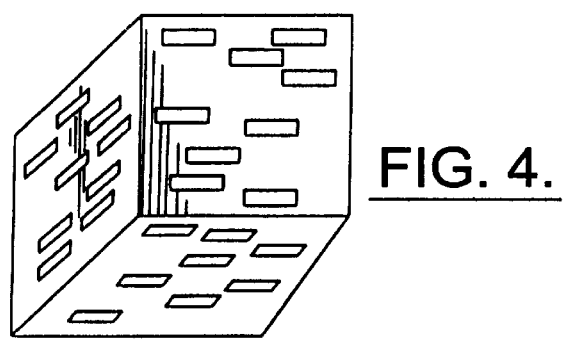
FIG. 4 is a perspective view of a corner-cube retroreflector having plates disposed in a non-regular pattern on one or more reflective surfaces thereof

In an effort to reduce the signature of a retroreflector in accordance with the present invention, the electrostatic plates may be disposed in a non-regular pattern on one or more reflective surfaces of the comer-cube retroreflector, as illustrated in FIG. 4. The non-regular pattern of the electrostatic plates on the corner-cube retroreflector 40 is less likely to produce a recognizable reflection when the electrostatic plates are in a curled position, which may prevent the reflection from being detected as a recognizable signal. This may be particularly advantageous when the corner-cube retroreflector 40 is being used in IFF tasks, wherein the retroreflector 40 is mounted on a targeted object that does not want to reflect a radiation signal having a distinguishable signature that may be identified by unfriendly forces. Therefore, the electrostatic plates may be configured in a non-regular pattern as shown in FIG. 4 so that any reflected radiation is substantially random in nature. Furthermore, the individual electrostatic plates can be selectively actuated to further increase the randomness of the reflected radiation.

Figure 5:
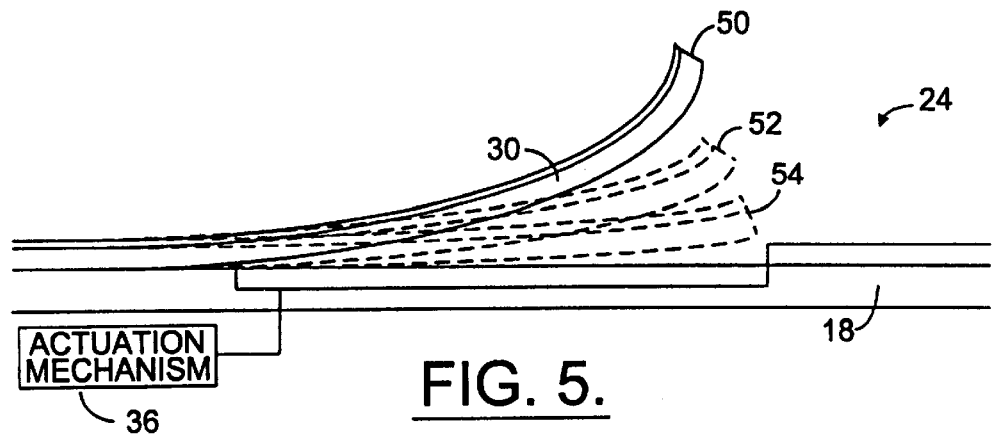
FIG. 5 is an elevational view of an electrostatic plate showing varying degrees of actuation.

Yet further, as illustrated in FIG. 5, the individual plate members 30 can be partially actuated to introduce a controllable degree of discontinuity in the reflective surface 24. As shown in FIG. 5, for illustrative purposes, the plate member 30 may be drawn toward the substrate 18 in varying degrees by applying a variable actuation voltage to the lower electrode 32. In a first position 50, the plate is in an unactuated position and is significantly curled away from the reflective surface 24. In a second position 52, the plate is partially actuated and the electrostatic pull of the lower electrode 32 draws the plate member 30 toward the reflective surface 24, and thereby, may cause less scattering of the incident radiation than when in position 50. In a third position 54, the plate is partially actuated to a greater degree than position 52, drawing plate member 30 relatively closer to the reflective surface 24, and thereby, may cause even less scattering than when in position 52. Accordingly, by selectively controlling the degree of actuation (i.e., the amount of curl of plate member 20), the scattering caused by an electrostatic late can be controlled. In addition, it is noted that a plurality of electrostatic members an be individually actuated at varying degrees in order to further increase the andomness with which the incident radiation signal is scattered, and to decrease the signature of the reflection.

Figure 6:
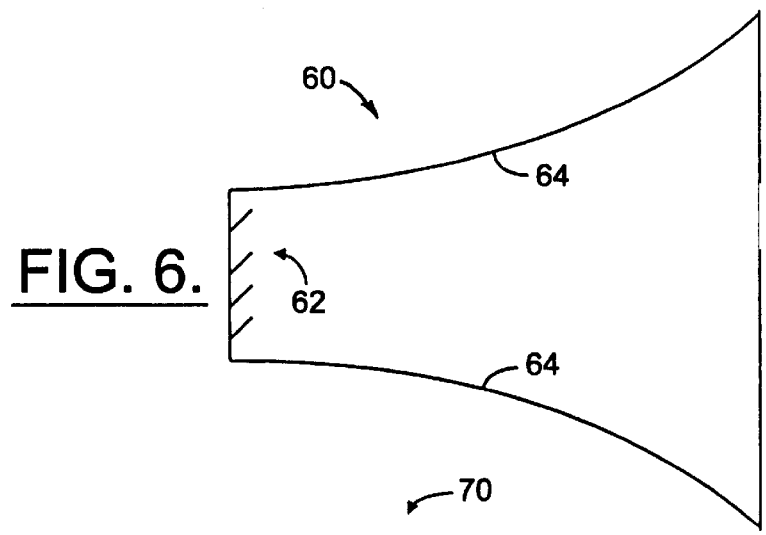
FIG. 6 is a cross-sectional view of a horn retroreflector having electrostatic plates in accordance with the present invention.
Figure 7:
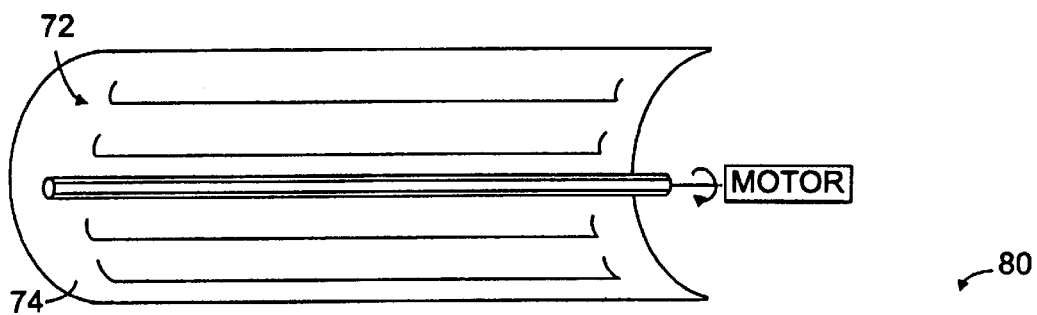
FIG. 7 is a perspective view of a parabolic retroreflector having electrostatic plates in accordance with a present invention.

With reference to FIG. 6, shown is a horn retroreflector 60 incorporating electrostatic plates 62 in accordance with the present invention. It is noted that the electrostatic plates 62 also can be located on a curved surface 64 of the horn reitroreflector 60. In another configuration, as illustrated in FIG. 7, a parabolic retroreflector 70 incorporates the electrostatic plates 72 on the reflector surface 74. The retroreflectors of FIGS. 6 and 7 may operate in substantially the same manner as the corner-cube retroreflector 10 described above. Specifically, when actuated, the electrostatic plates may reflect a substantial portion of the incident radiation so that the retroreflec;tors operate as intended, that is, a substantial portion of the reflective radiation signal is directed back in the direction from whence it came. When in an unactuated state, the electrostatic plates scatter the incident radiation so that a relatively smaller portion of the incident radiation is reflected back in the direction from whence it came.

Figure 8:
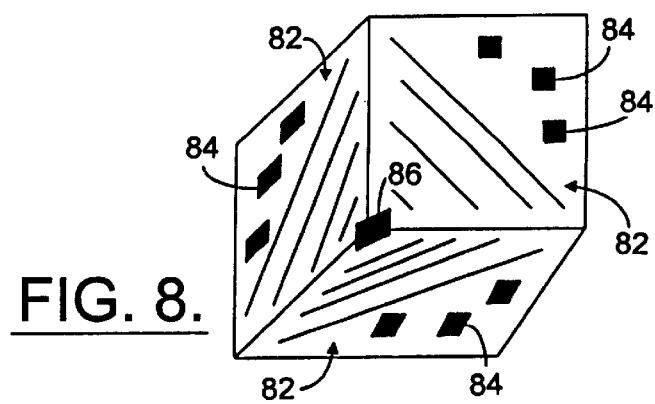
FIG. 8 is a perspective view of a corner-cube retroreflector having electrostatic plates in accordance with a present invention, and further including electronic devices on the reflected surfaces thereof

With reference to FIG. 8, shown is a corner-cube retroreflector 80 incorporating electrostatic plates 82 in accordance with the present invention and microelectronic devices such as emitters/detectors 84 disposed on the surfaces of the corner-cube retroreflector 80. As an alternative to emitters/detectors 84, the microelectronic devices may be memory devices, microprocessors, drivers, or other conventional microelectronic circuitry. Further, the corner-cube retroreflector 80 may include a centrally located microelectronic device such as a detector/emitter 86 positioned at the apex of the cornercube retroreflector 80. The emitters/detectors 84, 86 may be configured to operate in a particular frequency range so as to limit the bandwidth of sensitivity. For example, emitter/detectors 84, 86 may be radio transmitters, radio receivers, laser diodes, or light emitting diodes (LEDs). As a detector, the incident radiation signal may be received and processed by associated systems for determining if or what reflective signal would be appropriate. As an emitter, additional signals may be transmitted in a predetermined direction, or alternatively, the emitter may provide other particular functionalities as may be desirable.

It should be noted that while a plate 12, as described hereinbefore, is one embodiment of a deformable structure in accordance with the present invention for introducing discontinuity in a reflective surface, other means suitable for selectively altering the reflectivity of a reflector may be utilized. For example, a beam may be utilized. The beam may be rigidly mounted at one or more edges, and may be actuated in substantially the same manner as the plate embodiment. An illustrative embodiment of a beam in accordance with the present invention is described below.

Figure 9:
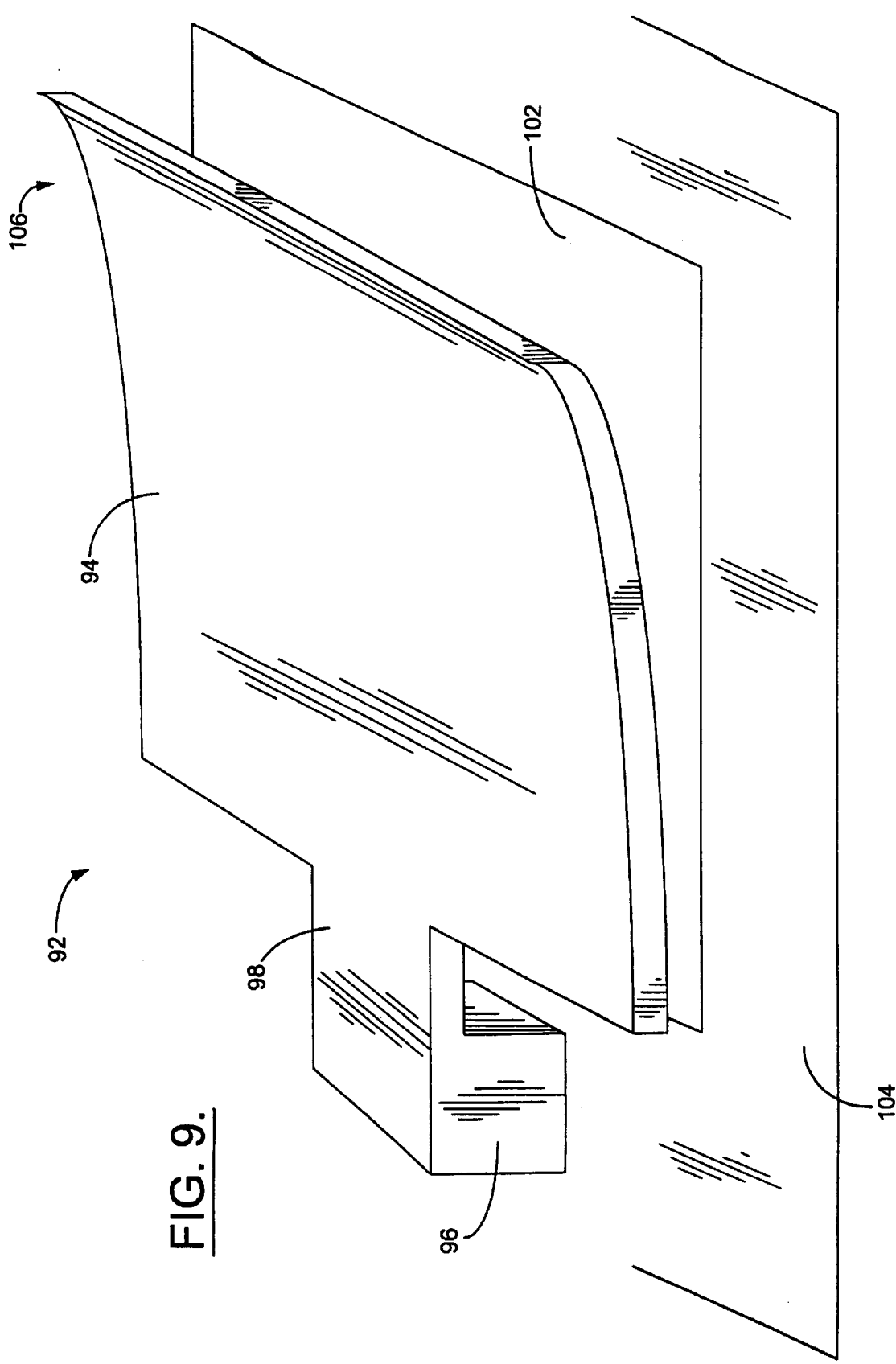
FIG. 9 is a perspective view of a beam structure in accordance with the present invention.

With reference to FIG. 9, a beam structure 92 comprises a reflective plate 94 that is attached to a substrate 104 by a substrate connection 96 in at least one location. An actuation mechanism 102 is preferably integrated in the substrate 104. The reflective plate 94 preferably comprises polysilicon with controlled residual stress so that the reflective plate 94 is substantially non-planar. Particularly, the reflective plate 94 may include a curl or bend 106 which operates to scatter, in an incoherent manner, the radiation incident the beam structure 92. Alternatively, the reflective plate 94 may be rigidly planar as compared to the substrate connection 96 which may contain residual stress, and therefore, the deformation of the beam structure 92 may primarily take place at the substrate connection 96.

The beam structure 94 can be actuated by numerous methods including electrostatically, thermally or magnetically. For purposes of the present disclosure, the beam structure is electrostatically activated. However, implementation of a thermally or magnetically actuated beam structure can be achieved in substantially the same manner as a thermally or magnetically actuated plate, as described above and as will be appreciated by those skilled in the art. Thus, the actuation mechanism 102 comprises an electrode 107 that can be selectively charged to create an electrostatic force for attracting the reflective plate 94 to the substrate 104, as illustrated in FIGS. 10A and 10B.

Figure 10A:
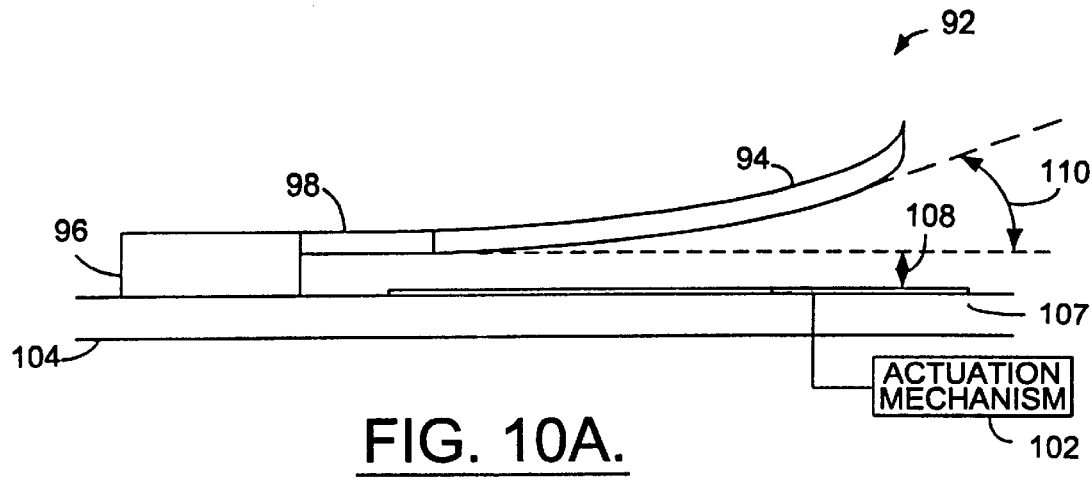
FIG. 10A is an elevational view of the beam structure of FIG. 9 in a non-planar position.
Figure 10B:
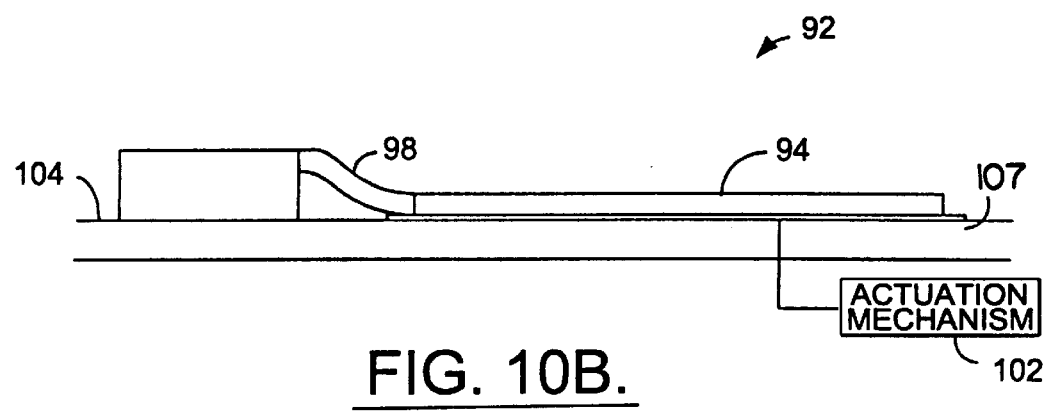
FIG. 10B is an elevational view of the beam structure of FIG. 9 in a planar position.

As particularly shown in FIG. 10A, the reflective plate 94 is preferably positioned at least 100 nanometer from the substrate 104, as represented by reference numeral 108.

The separation distance 108 will be a major determinant of the necessary actuation voltage, and can be tailored to suit the operational need of the device. Further, the reflective plate 94 preferably includes a curl or bend 106 with a radius of curvature between 10 centimeters and 1 meter. The amount of curl 106 should be large enough to scatter of the incident radiation, but as small as possible so as to reduce the voltage necessary to deform the reflective plate 94 into the position shown in FIG. 10B. Thus, engineering the amount curl 110 and the distance 108 may reduce the power consumption and increase the efficiency of the beam structure 92. Another determinant to be considered in the design is the trade-off between providing a larger reflecting surface area, while minimizing the voltage necessary to actuate the beam or plate.

Figure 11:
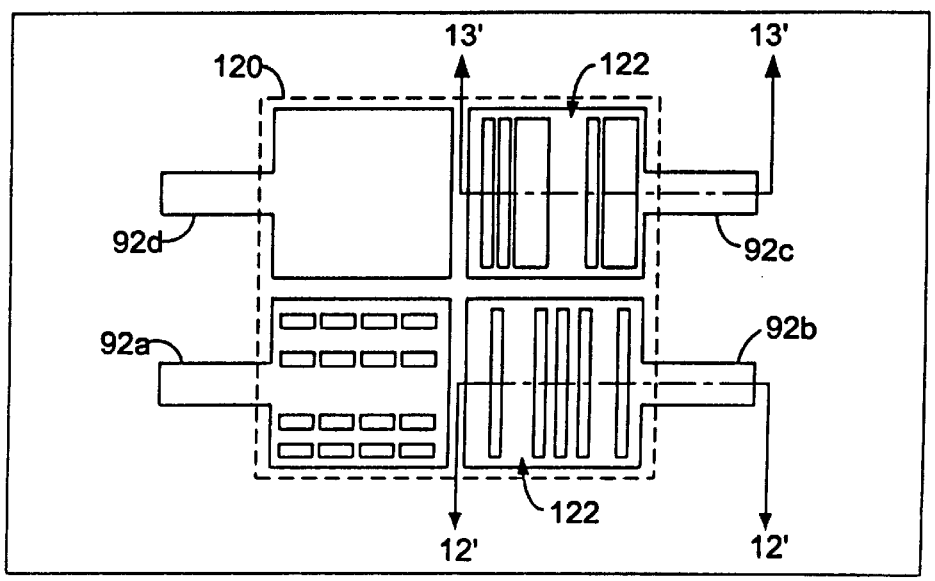
FIG. 11 is a top plan view of a group of beam structures which are collectively configured to form a reflective surface in accordance with the present invention.

With reference to FIG. 11, illustrated is a group of beam structures 92A–92D configured to form a single reflective area 120. By segmenting the reflective area 120 into multiple beam structures, more efficient and precise control over the reflective area can be achieved. Moreover, the respective beam structures can be individually actuated as may be desired to produce a distinctive reflected signal. In particular, the frequency of the encoded reflected signal and the power consumption of the beam structures might be improved by utilizing smaller beam structures to create a larger collective reflective surface or area.

Figure 12:
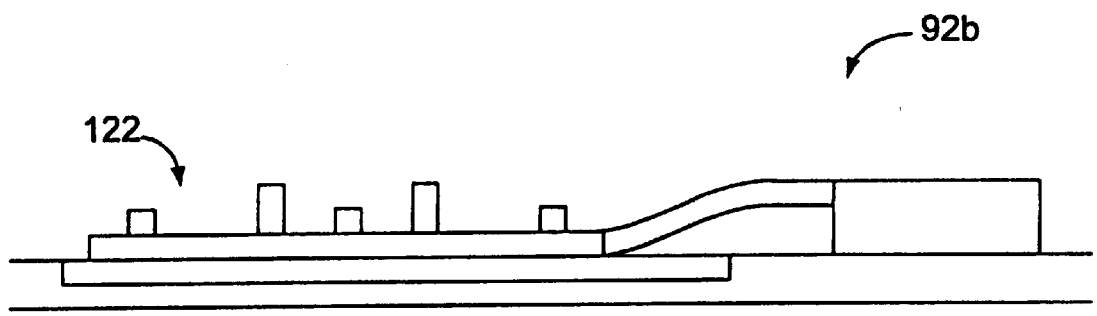
FIG. 12 is a cross-sectional view taken along line 12'—12' of FIG. 11.
Figure 13:
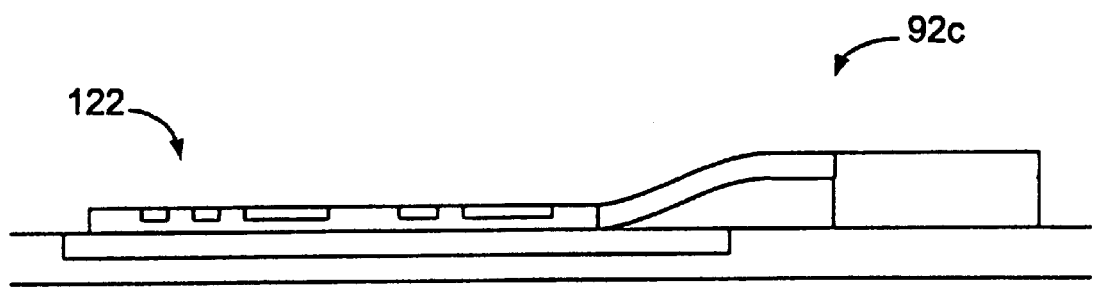
FIG. 13 is a cross-sectional view taken along line 13'—13' of FIG. 11.

With reference to FIGS. 12 and 13, cross-sectional views of the reflective surface of the respective beam structures 92a–92d are illustrated. The reflective surfaces of the respective beam structures 92a–92c of FIG. 11 include illustrative examples of threedimensional patterns 122 for passively encoding data onto a reflected signal, much like a barcode pattern. The three-dimensional patterns 122 may comprise projections fabricated on the reflective surface as illustrated in FIG. 12, or indentions (i.e., holes) whether filled or left empty, integrated in the reflected surfaces as illustrated in FIG. 13. The projections and indentions can be fabricated using MEMS technology as is known to those skilled in the art. Further, the structures comprising the three-dimensional pattern 122 may have optical characteristics different than that of the reflective surface of the respective beam structures. For example, one method may comprise a series of gold structures that are produced on the reflecting surface through the use of a polymer plating template and electroplated gold. Those skilled in the art will recognize that there are numerous other methods by which these three-dimensional patterns can be formed.

By encoding data in the reflective surface of the beam structures, the logic circuitry necessary to create a data messages to be encoded in a reflected signal (by modulating the plate) may be reduced. For instance, each beam structure may be individually actuated into either an "off" or "on" mode (i.e., actuated or unactuated position). In this position, each beam structure is capable of reflecting an incident radiation signal in a distinctive manner so as to encode a specific message to the recipient of a reflected signal. Thus, four beam structures can encode at least four distinctive messages onto a reflected signal. This not only reduces the logic necessary to create a data message, but it also reduces the energy necessary for encoding the data since the beam structure does not have to be modulated in a repetitive fashion.

Figure 14:
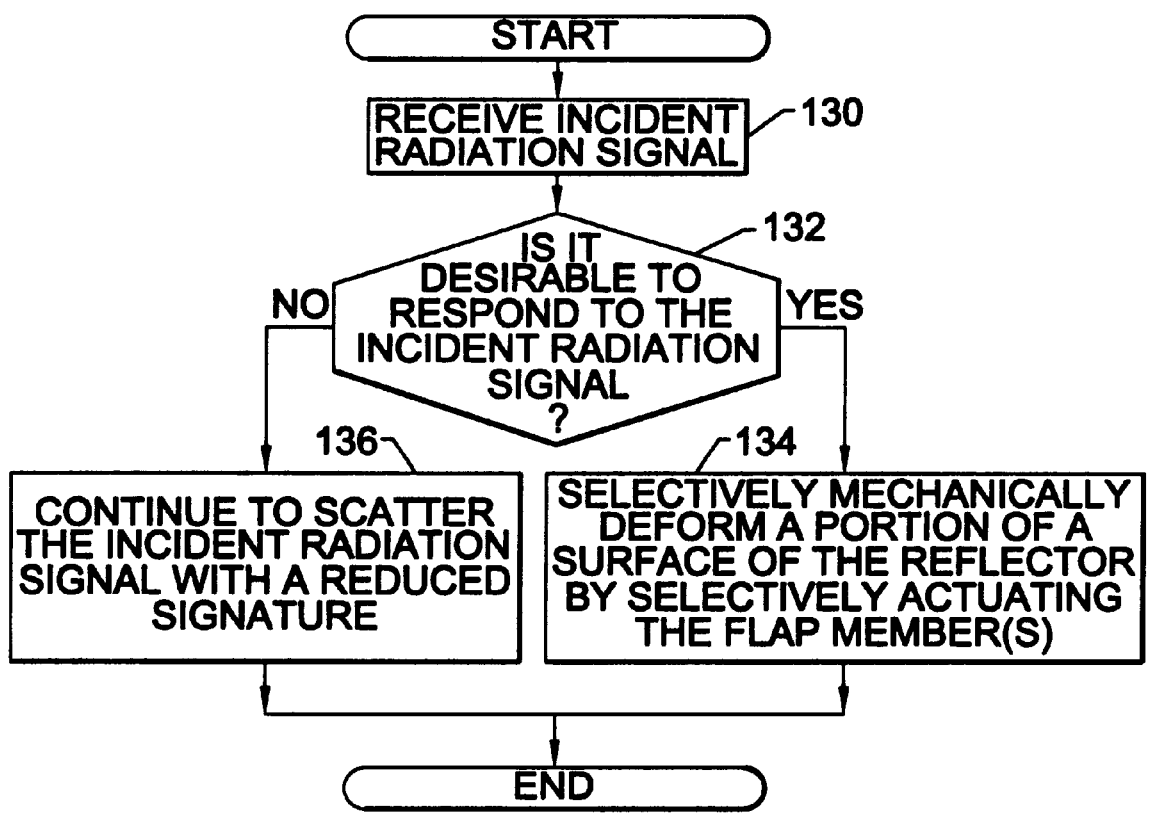
FIG. 14 is a flow chart of the operation of the corner-cube retroreflector of FIG. 8 in accordance with the present invention.

In operation, as illustrated in FIG. 14, the electrostatic plates 82 of the cornercube retroreflector 80 are initially in a normal, unactuated position such that only a small portion, if any, of a radiation signal is reflected back to the radiation source. Upon receiving an incident radiation signal, as indicated by block 130, which may be detected by one or more of the emitters/detectors 84, 86, the appropriate processing of the received incident radiation signal determines whether the electrostatic plates 82 should be actuated so as to respond to the incident radiation signal, as indicated by block 132. If it is desirable to respond, the corner-cube retroreflector 80 selectively mechanically deforms a portion of the reflective surface by actuating one or more plate members to selectively reflect a portion of the incident radiation signal as indicated by block 134. Alternatively, the plate member remains in a normal, unactuated position, as indicated by block 136. In addition, one or more of the emitters/detectors 84, 86 may emit a radiation signal which can be received by the source of the incident radiation signal.

Because the retroreflector structures described herein can be manufactured using microelectronic substrates, it is noted that electronic circuitry for driving or controlling the operation of the electrostatic plates and/or the emitter/detectors can be fabricated on the microelectronic substrates comprising the retroreflector. Furthermore the emitter/detectors may be mounted to the microelectronic substrates in a variety of known methods including Surface Mount Technology (SMT) through-hole, flip-chip and Multi-chip Module (MCM) constructions.

In the drawings and specification, there have been disclosed typical preferred embodiments of the invention and, although specific terms are employed, they are used in a generic and descriptive sense only and not for purposes of limitation; the scope of the invention makes set forth in the following claims.

Wherefore, the following is claimed:

1. A microfabricated reflector that can receive an incident radiation signal from a radiation source and alter a reflectivity thereof comprising:

a reflective structure which reflects said incident radiation signal to produce said reflected radiation signal said reflective structure comprising at least one reflective surface; and at least one moveable plate associated with a portion of said reflective surface of said reflective structure for selectively introducing discontinuity in said portion of said reflective surface to selectively alter said reflectivity thereof and scatter said reflected radiation signal when said at least one moveable plate for introducing discontinuity is selectively actuated.

2. The microfabricated reflector of claim 1, wherein at least one said moveable plate includes a plate member having a first material layer of a first residual stress value and a second material layer disposed opposite said first layer, said second layer of a second residual stress value that is different than said first residual stress value causing said plate member to become non-planar, thereby creating said discontinuity.

3. The microfabricated reflector of claim 1, wherein said moveable plate is individually actuated.

4. The microfabricated reflector of claim 1, wherein said moveable plate is electrostatically actuated.

5. A microfabricated reflector that can receive an incident radiation signal from a radiation source and alter a reflectivity thereof, comprising:
   a reflective structure which reflects said incident radiation signal to produce said reflected radiation signal, said reflective structure comprising at least one reflective surface, and
   means associated with a portion of said reflective surface of said reflective structure for selectively introducing discontinuity in said portion of said reflective surface to selectively alter said reflectivity thereof and scatter said reflected radiation signal when said means for introducing discontinuity is selectively actuated, wherein said means for introducing discontinuity comprises a plurality of moveable plates, and wherein said moveable plates are located on said reflective surface in a non-regular pattern.

6. A microfabricated reflector that can receive an incident radiation signal from a radiation source and alter a reflectivity thereof, comprising:
   a reflective structure which reflects said incident radiation signal to produce said reflected radiation signal, said reflective structure comprising at least one reflective surface, and
   means associated with a portion of said reflective surface of said reflective structure for selectively introducing discontinuity in said portion of said reflective surface to selectively alter said reflectivity thereof and scatter said reflected radiation signal when said means for introducing discontinuity is selectively actuated, wherein said means for introducing discontinuity comprises at least one beam structure.

7. The microfabricated reflector of claim 6, wherein said beam structure comprises a cantilever.

8. The microfabricated reflector of claim 6, wherein said beam structure comprises a hinged plate.

9. The microfabricated reflector of claim 6, wherein said beam structure includes a reflective plate substantially parallel to said reflective surface, and a post attached at a proximate end to said reflective surface and attached at a distal end to said reflective plate.

10. The microfabricated reflector of claim 9, wherein said reflective plate comprises a three-dimensional surface for selectively reflecting said incident radiation signal to generate a distinctive signal.

11. The microfabricated reflector of claim 6, wherein said beam structure is electrostatically actuated.

12. The microfabricated reflector of claim 6, wherein said beam structure is thermally actuated.

13. The microfabricated reflector of claim 6, wherein said beam structure is magnetically actuated.

14. The microfabricated reflector of claim 6, wherein said means for introducing discontinuity comprises a plurality of beam structures, each beam structure being individually actuatable.

15. The microfabricated reflector of claim 14, wherein beam structures are configured in a non-regular pattern on said reflective surface.

16. The microfabricated reflector of claim 15, wherein beam structures are configured in a regular pattern on said reflective surface.

17. A microfabricated reflector that can receive an incident radiation signal from a radiation source and alter a reflectivity thereof, comprising:
   a reflective structure which reflects said incident radiation signal to produce said reflected radiation signal, said reflective structure comprising at least one reflective surface; and
   means associated with a portion of said reflective surface of said reflective structure for selectively introducing discontinuity in said portion of said reflective surface to selectively alter said reflectivity thereof and scatter said reflected radiation signal when said means for introducing discontinuity is selectively actuated, wherein said means for introducing discontinuity can be controllably actuated to vary an amount of said incident radiation signal that is reflected.

18. A microfabricated reflector that can receive an incident radiation signal from a radiation source and alter a reflectivity thereof, comprising:
   a reflective structure which reflects said incident radiation signal to produce said reflected radiation signal said reflective structure comprising at least one reflective surface; and
   means associated with a portion of said reflective surface of said reflective structure for selectively introducing discontinuity in said portion of said reflective surface to selectively alter said reflectivity thereof and scatter said reflected radiation signal when said means for introducing discontinuity is selectively actuated, further comprising means for selectively actuating said means for introducing discontinuity, said means for actuating in communication with said means for introducing discontinuity, wherein said means for actuating comprises a microprocessor.

19. A microfabricated reflector for passively encoding data on a reflected radiation signal, comprising:
   a reflective structure having at least one reflective surface that reflects an incident radiation signal towards a source thereof; and
   a deformable structure that is selectively actuatable and located on at least a portion of said reflective surface of said reflective structure for introducing discontinuity in said portion of said reflective surface to scatter said incident radiation signal, thereby encoding data on said reflected radiation signal in accordance with selective actuation of said deformable structure, wherein said deformable structure is a plate.

20. A microfabricated reflector for passively encoding data on a reflected radiation signal. comprising:
   a reflective structure having at least one reflective surface that reflects an incident radiation signal towards a source thereof; and
   a deformable structure that is selectively actuatable and located on at least a portion of said reflective surface of said reflective structure for introducing discontinuity in said portion of said reflective surface to scatter said incident radiation signal. thereby encoding data on said reflected radiation signal in accordance with selective actuation of said deformable structure, wherein said plate comprises a first layer of a first material having a first residual stress value and a second layer of a second material having a residual stress value different from said first residual stress value.

21. A microfabricated reflector for passively encoding data on a reflected radiation signal, comprising:

a reflective structure having at least one reflective surface that reflects an incident radiation signal towards a source thereof, and a deformable structure that is selectively actuatable and located on at least a portion of said reflective surface of said reflective structure for introducing discontinuity in said portion of said reflective surface to scatter said incident radiation signal, thereby encoding data on said reflected radiation signal in accordance with selective actuation of said deformable structure, wherein said deformable structure is a beam.

22. The microfabricated reflector of claim 21, wherein said beam includes a reflective plate substantially parallel to said reflective surface, and a substrate connection at a proximate end to said reflective surface, and a distal end to said reflective plate.

23. A microfabricated reflector for passively encoding data on a reflected radiation signal comprising:

a reflective structure having at least one reflective surface that reflects an incident radiation signal towards a source thereof, and a deformable structure that is selectively actuatable and located on at least a portion of said reflective surface of said reflective structure for introducing discontinuity in said portion of said reflective surface to scatter said incident radiation signal, thereby encoding data on said reflected radiation signal in accordance with selective actuation of said deformable structure, further including a second deformable structure located on a second reflective surface of said reflective structure.

24. The microfabricated reflector of claim 23, wherein said deformable structure and said second deformable structure are individually actuatable.

25. A microfabricated reflector for passively encoding data on a reflected radiation signal, comprising:

a reflective structure having at least one reflective surface that reflects an incident radiation signal towards a source thereof, and a deformable structure that is selectively actuatable and located on at least a portion of said reflective surface of said reflective structure for introducing discontinuity in said portion of said reflective surface to scatter said incident radiation signal, thereby encoding data on said reflected radiation signal in accordance with selective actuation of said deformable structure, wherein said deformable structure includes a first material layer of a first residual stress value and a second material layer disposed opposite said first layer, said second material layer of a second residual stress value which is different than said first residual stress value causing said plate member to move, thereby creating said discontinuity.

26. A microfabricated reflector for passively encoding data on a reflected radiation signal, comprising:

a reflective structure having at least one reflective surface that reflects an incident radiation signal towards a source thereof, a deformable structure that is selectively actuatable and located on at least a portion of said reflective surface of said reflective structure for introducing discontinuity in said portion of said reflective surface to scatter said incident radiation signal thereby encoding data on said reflected radiation signal in accordance with selective actuation of said deformable structure; and means for actuating said deformable structure, said means for actuating in communication with said deformable structure, wherein said means for actuating is a microprocessor.

27. A microfabricated reflector for passively encoding data on a reflected radiation signal, comprising:

a substrate;

a substrate connector attachment at a proximate end to said substrate; and a reflective plate having a reflective surface, said plate attached to said substrate connector, wherein said reflective surface of said plate includes a three-dimensional pattern for encoding data on said reflected signal.

28. The microfabriced reflector of claim 27, wherein said plate further comprising a curl in a portion thereof.

29. The microfabricated reflector of claim 28, wherein said plate includes at least a first edges and a second edge, and wherein said plate is attached to said substrate connector at said first edge and said curl is about said second edge.

30. The microfabricated reflector of claim 28, wherein the radius of curvature of said curl is approximately between 1 centimeter and 1 meter.

* * * * *

UNITED STATES PATENT AND TRADEMARK OFFICE
CERTIFICATE OF CORRECTION

PATENT NO. : 6,137,623
DATED : October 24, 2000
INVENTOR(S) : Roberson et al.

It is certified that error appears in the above-identified patent and that said Letters Patent is hereby corrected as shown below:

Title page, [56] References Cited:
U.S. PATENT DOCUMENTS, line 9, "4,731,869" should read --4,731,879--.
OTHER PUBLICATIONS, line 8, "1601-1604" should read --6101-6104--.

Column 12, line 65, after "signal", second occurrence, insert a comma (,).

Column 14, line 33, after "signal", second occurrence, insert a comma (,).

Column 16, line 40, "microfabriced" should read --microfabricated--; line 41, "comprising" should read --comprises--; line 43, "edges" should read --edge--.

Signed and Sealed this

Twenty-ninth Day of May, 2001

*Attest:*

NICHOLAS P. GODICI

*Attesting Officer*     *Acting Director of the United States Patent and Trademark Office*